Patented Feb. 15, 1949

2,461,519

UNITED STATES PATENT OFFICE 2,461,519

METHOD OF PRODUCING CARBOXYLIC SUBSTITUTED ALIPHATIC AMINES AND METALLIC SALTS THEREOF

Frederick C. Bersworth, Verona, N. J.

No Drawing. Application March 17, 1948, Serial No. 15,514

7 Claims. (Cl. 260—534)

This invention relates to chemical processes and has for its object the provision of an improved method of producing carboxylated aliphatic amines.

Another object is to provide an economically practical process for producing poly-amino poly-carboxylic acids and various acid and neutral salts thereof and poly-metallic salts of said acids.

More specifically, the object of the invention is to provide an economically practical method of converting ethylene diamine and its homologues and derivatives into carboxylic substituted amines.

A further object is to provide a method of producing ethylene diamine mono- to tetra-acetic acid and of producing various neutral and acid salts and various poly-metallic salts of ethylene diamine poly-acetic acid.

Other objects will be apparent as the invention is more fully hereinafter disclosed.

In accordance with these objects I have devised an improved method of carboxylating an aliphatic amine which contains at least one amino nitrogen group attached to an aliphatic carbon in which amino nitrogen group there is at least one amino hydrogen, which method is highly economical and commercially practical and is adapted to wide modification without essential departure therefrom to produce mono- to poly-carboxylic substituted products from the amine, depending upon the total number of displaceable amino hydrogens contained in the amine, and of producing from the poly-substituted amines a plurality of neutral and acid salts thereof and poly-metallic salts thereof, all as will be more fully hereinafter disclosed.

Heretofore in the art, two major processes have been proposed for the production of carboxylic-substituted amines. One is the so-called chlor-acetic acid process and the other the cyanide process. In prior Patents No. 2,387,735 issued October 30, 1945, and No. 2,407,645 issued September 17, 1946, I have disclosed and claimed the process for producing such carboxylic substituted aliphatic amines by the latter or cyanide process. The present invention is an improvement of the process of said prior patents.

The process of said prior patents is based upon the chemical reaction which occurs when formaldehyde is added slowly or in small increments to a heated and agitated alkaline pH aqueous solution containing an alkali metal cyanide and an aliphatic amine having at least one amino nitrogen group attached to an aliphatic carbon in which group there is at least one displaceable amino hydrogen. The formaldehyde reacts with the alkali metal cyanide to form an organic complex which hydrolyzes with liberation of ammonia ($NH_3$) into a carboxylic substituent group which displaces the amino hydrogen of the amine forming a carboxylic substituted amine.

By limiting the alkali metal cyanide content of the solution and the formaldehyde additions to equivalent molar reacting weights per molar weight of amino hydrogens to be displaced in the amine the reaction may be controlled in such manner as to form in the alkaline pH solution the mono- and poly-carboxylic substituted products with each substituent carboxylic group neutralized by an alkali metal ion. By removing the $NH_3$ (gas) from the reaction solution as rapidly as formed and preventing atmospheric gases from contacting the heated and agitated solution the formation of side reaction and decomposition products is greatly minimized and consistently high yields of the alkali metal salts of the mono- and poly-carboxylic substituted aliphatic amine may be obtained. To recover the carboxylic amino acid from this salt the aqueous solution is acidified with a strong mineral acid to a pH at which the amino acid is most insoluble and separating the precipitated acid from the acid pH solution.

In the practice of this general method, the free alkali metal hydroxide of the reaction solution materially interferes with the subsequent recovery of the carboxylic amino acid upon acidification with a strong mineral acid forming alkali metal salts with the mineral acid which tend to form highly soluble complexes with the carboxylic amino acid that resist decomposition by the strong mineral acid at the pH of normal precipitation. Further, the presence of this free alkali metal hydroxide in the reaction solution precludes the recovery of the alkali metal salts of the carboxylic amino acid from the aqueous solution in any great percent recovery and high state of purity. Still further, the presence of this free alkali metal hydroxide precludes the formation in the reaction solution of acid-alkali metal salts of the polycarboxylic amino acids or of poly-metallic salts of these said polycarboxylic amino acids. Finally, the preparation of alkali metal salts of alkali metals other than sodium by this general process is economically impractical due to the high price and non-availability of the cyanide compounds of potassium, lithium and caesium.

I have discovered that these limitations of my prior process may be avoided and overcome by incorporating in the reaction solution initially a determined quantity of the aliphatic amine, an amount of an alkali metal cyanide providing with any given constant rate of formaldehyde addition a relatively large concentration of cyanide as compared to formaldehyde at any given instant, and an amount of alkali metal hydroxide which is approximately sufficient to provide a pH of about 8 in the reaction solution. During the formaldehyde addition to the heated and agitated reaction solution I then add hydrogen cyanide and alkali metal hydroxide or alternatively alkali metal cyanide at such rates and in such amounts as will effectively maintain substantially constant the cyanide concentration of the solution until the desired molar equivalent reacting weights per molar weight of amino hydrogen to be displaced of cyanide ions (CN)− and alkali metal ions (Na)+ have been so introduced into the reaction solution, the formaldehyde addition continuing for a time thereafter until its molar equivalent reacting weight per molar weight of amino hydrogen to be displaced, has passed into the reaction solution. During the interval of formaldehyde solution the gaseous ammonia (NH$_3$) liberated by the reaction is removed from the reaction zone as rapidly as possible while excluding atmospheric gas from contact with the reaction solution.

In the practice of this improved process a reaction temperature as low as 60° C. and as high as 100° C. may be employed. As the rates of reaction of the three chemical reactions involved vary markedly with variations in temperature, increasing with increase in temperature, it is desirable to maintain a substantially constant reaction temperature within this range. It is preferred to employ a reaction temperature which is maintained substantially constant at about 95° C. although fluctuations in temperature as much as 5° above and below this preferred reaction temperature are not materially detrimental to the efficiency of the process.

The major advantage obtained by the practice of this improved process is that the free alkali metal hydroxide content of the reaction solution is ultimately completely neutralized by the hydrogen cyanide with the result that the final reaction solution containing the carboxylic amino acid is free of such alkali metal hydroxide permitting the recovery of the amino acid salt product therein by the removal of the water of solution as by evaporation. Moreover, upon acidification with a strong mineral acid to a pH at which the amino acid is most insoluble, the consumption of mineral acid due to excess caustic alkali is materially reduced and the formation of non-decomposable amino acid complexes lowering the expected yield of the acid is substantially eliminated.

The invention may be best described to one skilled in the art by way of example and not by way of limitation by a disclosure of the same as it has been adapted commercially to the formation of the various types of amino acids and salts obtainable from an aliphatic diamine, such as ethylene diamine, or one of its homologues.

Ethylene diamine is typical of the type of aliphatic primary and secondary amines, diamines and polyamines to which the present invention is applicable. This amine contains two amino nitrogen groups each of which is attached directly to an aliphatic carbon and in each of which there are two displaceable amino hydrogen atoms. From this diamine, by the practice of the present invention, I may form the mono-, di-, tri- and tetra-carboxylic (acetic) substituted acid, any alkali metal salt thereof, and various alkali metal acid salts and poly-metallic salts as will be hereinafter described.

The invention first will be described as it is practiced in the formation of ethylene diamine tetra-acetic acid:

A known quantity of ethylene diamine is dissolved in water to form a 25%–30% aqueous solution. To this solution I add about 1 molar weight of an alkali metal cyanide, such as sodium cyanide, per molar weight of diamine, and from .20 to .50 molar weights of an alkali metal hydroxide, such as sodium hydroxide, to a pH of about 8 and dilute the whole solution to have a concentration of about 50% contained solids.

This reaction solution is placed in a container provided with heating and cooling coils for the accurate control of the temperature of the solution; and provided with a reflux condenser closing the container to the atmosphere except through a pressure release valve venting the uncondensed gases to the atmosphere at a low positive pressure excluding atmospheric gases from the container; and provided with means, such as a stirrer device, for vigorously agitating the solution in the container.

The reaction solution is heated to a temperature approximately 95° C. and formaldehyde in 37% aqueous solution is added thereto at a determined slow rate introducing approximately 1/3rd molar weight of formaldehyde per ½ hour. Evolution of gaseous ammonia (NH$_3$) from the heated agitated reaction solution occurs within a short time interval after the first of the formaldehyde enters the solution and as soon as the pressure of this gas has built up sufficiently to exclude atmospheric gases from the container, liquid hydrogen cyanide and alkali metal hydroxide (in ageous solution) are fed separately into the reaction solution, each at such a rate relative to the rate of formaldehyde addition as will maintain the alkali metal cyanide content of the solution and the free alkali metal hydroxide content of the solution substantially constant in about the amounts originally introduced therein.

As the total alkali metal ion content of the solution approximates four alkali metal ions per molar weight of ethylene diamine, the flow of alkali metal hydroxide into the reaction solution is terminated.

As the total cyanide ion content of the solution approximates four cyanide ions per molar weight of the ethylene diamine the flow of hydrogen cyanide into the reaction is terminated.

As the total formaldehyde content of the solution approximates four molar weights per molar weight of ethylene diamine the flow of the formaldehyde solution into the reaction solution is terminated.

The temperature of the reaction solution is then gradually increased above the determined maintained reaction temperature of 95° C. until a temperature of about 110° C. is obtained, and the reaction solution is held at this temperature with constant agitation for an extended length of time effective to complete the chemical reactions involved and to attain chemical equilibrium conditions therein, meanwhile removing as rapidly as possible the ammonia gases being evolved therefrom.

As a final step in the process, the residual ammonia gas remaining in the solution is stripped therefrom by passing steam through the hot, agitated solution with the reflux condenser removed.

The resultant reaction solution consists essentially of an aqueous solution of the tetra alkali metal salt of ethylene diamine tetra-acetic acid concentration 35–40%, free of alkali metal cyanide, alkali metal hydroxide and formaldehyde where the relative proportions of these ingredients have been properly proportioned as above described and where these ingredients and the ethylene diamine are substantially free themselves of associated impurities.

Usually, I find that when this process is operated on a commercial scale with the highest purity of materials obtainable, the amount of the tetra salt product obtained varies between 90% to 95% of the theoretical. I therefore prefer to limit the cyanide content added to the solution to approximately 95% of the theoretical and to employ a slight excess of the theoretical formaldehyde content to insure the complete decomposition of the cyanide content of the solution by reaction with the formaldehyde.

The tetra salt product of this final solution may be recovered by evaporating off the water of solution. The amino acid of this tetra salt may be recovered by acidifying the solution with a strong mineral acid (HCl or $H_2SO_4$) to a pH of about 1.2. A yield of about 90% of the theoretical, based on the tetra salt content of the solution, is normally attained on acidification. This yield will vary depending on the purity of the acid and upon the temperature of the wash water employed to remove the last traces of the acidified solution from the precipitated amino acid.

In the practice of this general method, the precise relative proportions of ingredients used may be varied without essential departure depending upon whether the mono-, di-, tri- or tetra-salt of the acid is desired, and as to what specific metal salt is desired, although in this latter case where poly-metal salts are desired the two primary carboxylic acid groups of the amino-acid must first be neutralized by alkali metal ions to stabilize the compound for neutralization of the secondary carboxylic groups by lesser basic metallic ions.

In the production of the mono-substituted amino-acid product, in accordance with the above described process, the amounts of sodium hydroxide, hydrogen cyanide and formaldehyde are each reduced to one-fourth of the amounts specified above. The di- and tri-substituted amino-acid products may be formed by using one-half and three-quarters of each of the amounts of sodium hydroxide, hydrogen cyanide and formaldehyde specified above, respectively.

In forming the potassium, lithium and caesium salts of the mono- to tetra-substituted amino acid, the potassium, lithium or caesium hydroxide is substituted for the sodium hydroxide. This practice provides considerable economies as the potassium, lithium and caesium hydroxide compounds are readily obtainable at a reasonable price and in any reasonable quantity, whereas other salts of these elements are high in price and difficult to obtain in any great quantity.

Acid-alkali metal salts of ethylene diamine tetra-acetic acid may be formed in the reaction solution by limiting the alkali metal ion content of the solution to not less than two or more than three alkali metal ions per molar weight of ethylene diamine. This provides for the formation of the di-alkali metal-di-acid salt or for the formation of the tri-alkali-mono-acid salt of ethylene diamine tetra-acetic acid. These salts may be recovered by evaporating off the water of solution.

Poly-metallic salts of ethylene diamine tetra-acetic acid may be formed by the addition of any basic metal compound, such as the oxide, hydroxide and carbonate compounds, to aqueous solutions of the di-alkali and tri-alkali metal-acid salts formed as above described. Such additions may be made before or after the acid salt has been produced in the reaction solution. Substantially any basic metal oxide, hydroxide or carbonate will be decomposed by the acid carboxylic groups in the di-alkali metal or tri-alkali salt of ethylene diamine tetra-acetic acid forming poly-metal tetra salts of high solubility in water, many of which have unusual and unexpected chemical properties of great utility in the art.

As an illustration of the formation of a poly-metal salt of ethylene diamine: one molar weight of an alkali metal hydroxide, such as sodium hydroxide, per molar weight of ethylene diamine and one molar weight of an alkali metal cyanide, such as sodium cyanide, are incorporated in the aqueous diamine reaction solution of the above specific embodiment, prior to the introduction of formaldehyde therein. Hydrogen cyanide and formaldehyde additions each in an amount approximating four molar weights per molar weight of ethylene diamine are made to the solution precisely as described in the specific example without further additions of sodium hydroxide to the reaction solution. The resultant reaction solution is heated with stirring and with rapid removal of ammonia ($NH_3$) to a final temperature of about 120° C. for an extended time interval to attain equilibrium conditions therein. The final reaction product obtained consists of an aqueous solution of the di-alkali metal di-acid salt of ethylene diamine tetra-acetic acid which salt may be recovered therefrom by evaporating off the water of solution.

To this aqueous solution of the di-alkali metal salt of ethylene diamine tetra-acetic acid I add an amount of a metallic oxide, hydroxide or carbonate, such as copper oxide or hydroxide, in an amount empirically required to neutralize both of the acid hydrogens on the two (2) unneutralized carboxylic groups of the di-alkali metal salt, with heating, if required, and stirring, to promote the acid-base chemical reaction involved. Most metallic oxides, hydroxides and carbonates dissolve readily in the solution. In the case of the copper reaction product a di-alkali metal, mono-copper salt of ethylene diamine tetra-acetic acid is formed, the di-valent copper ion satisfying chemically both acid carboxylic groups of the di-alkali metal salt.

The poly-metallic salts of ethylene diamine tetra-acetic acid thus formed are highly soluble in aqueous solutions and may be recovered from the reaction solution by evaporating off the water of solution. These poly-metallic salts of ethylene diamine tetra-acetic acid are extremely active as sequestering agents for acidic, basic and neutral salts present in aqueous solutions to which they may be added forming complex mono- and poly-molecular compounds therewith of high chemical and thermal stability. Polyvalent metals form poly-molecular complexes which have unexpectedly high sequestering powers. The precise compositions of these complexes are at present unknown.

Alternatively, the metal oxides, hydroxides and carbonates can be added to the reaction solution during the formation of the di-alkali metal salt for solution by the di-alkali metal acid salt as the di-alkali metal acid salt is formed or by the hydrogen cyanide as added to the reaction solution with excellent results but the first method is preferred as this method produces the most certain and controllable results as to salt composition.

In substitution for ethylene diamine in the above disclosed invention I may employ derivatives of this amine wherein one or both of the primary amino hydrogens have been displaced by substituent groups which are stable under the conditions of reaction and are not displaceable by the carboxylic groups present, thereby forming mono- or di-substituted-mono, di- and tri-carboxylated ethylene diamine compounds, many of which have unusual chemical properties.

In substitution for ethylene diamine I may also employ any aliphatic primary or secondary amine having at least one amino nitrogen group attached to an aliphatic carbon in which amino group there is at least one displaceable amino hydrogen to form carboxylic substituted aliphatic amines; and I may also employ diamines belonging to the same homologous series with ethylene diamine to form a homologous series of substituted diamines to that described hereinabove; and may also employ any aliphatic polyamine having an amino nitrogen group attached to an aliphatic carbon in which group there is at least one displaceable amino hydrogen to form similar type carboxylic substituted amines to those hereinabove described, many evidencing similar chemical properties. In view thereof, by the use of the term ethylene diamine as it appears hereinafter in the claims, this term is meant to include any and all of these substantially equivalent amines in the practice of the method invention hereinabove disclosed.

Having hereinabove disclosed the present invention generically and specifically and given one specific example of the same with a plurality of contemplated modifications thereof and identified substantial equivalents for the specific reactants named, it is believed apparent that the same may be widely varied and widely modified without essential departure from the same and from the appended claims.

What I claim is:

1. The method of forming carboxylic substituted aliphatic amines which comprises forming an aqueous reaction solution containing a known weight of ethylene diamine, a smaller quantity of an alkali metal cyanide and an alkali metal hydroxide sufficient to produce a pH of at least 8 in the reaction solution, heating the solution to a determined and maintained reaction temperature within the range 60–100° C. under a refluxing condenser maintaining a low positive pressure of uncondensed gases over the solution sufficient to exclude atmospheric gases from contact with the solution, adding formaldehyde in aqueous solution to the reaction solution while vigorously agitating the same, the rate of addition of said formaldehyde being at a substantially constant rate providing at any one instant a relatively low concentration of formaldehyde in the solution as compared with the concentration of alkali metal cyanide therein, and adding separately to the solution during the formaldehyde addition a sufficient amount of hydrogen cyanide and alkali metal hydroxide in aqueous solution to maintain the alkali metal cyanide content and the pH of the reaction solution substantially constant therein, terminating the alkali metal hydroxide addition when the alkali metal ion content of the solution approximates that providing one alkali metal ion per amino hydrogen to be displaced in the diamine, terminating the hydrogen cyanide addition to the solution when the cyanide ion content of the solution approximates one cyanide ion per amino hydrogen to be displaced from the diamine, terminating the formaldehyde addition when the formaldehyde additions approximate one molar weight per amino hydrogen to be displaced, and heating the reaction solution to a temperature above the reaction temperature but not over about 120° C. for an extended time interval to complete the chemical reactions involved and to expel therefrom all residual gaseous ammonia.

2. The method of claim 1, wherein the amount of formaldehyde addition equals four molar weights per molar weight of diamine and the cyanide ion content of the solution is limited to not over four ions per molar weight of diamine and the amount of alkali metal ions in the solution is at least two ions and not over four ions per molar weight of diamine.

3. The method of claim 1, wherein four molar weights of formaldehyde per molar weight of diamine are added to the reaction solution and an amount of cyanide ions not exceeding four per molar weight of diamine is incorporated in the reaction solution, and wherein the total of alkali metal ions introduced into the reaction solution is limited to two per molar weight of diamine.

4. The method of claim 3, wherein a basic metallic compound other than a basic alkali metal compound is added to the final reaction solution in an amount empirically required to neutralize the acid carboxylic groups present therein.

5. The method of claim 3, wherein an amount of a basic metallic compound other than a basic alkali metal compound is added to the reaction solution in an amount approximately sufficient to neutralize the free carboxylic groups present in the final reaction solution which are unsatisfied by the alkali metal ions present therein.

6. The method of claim 2, wherein the total alkali metal ions present in the reaction solution is limited to three per molar weight of diamine and wherein the remaining carboxylic groups present in the reaction solution are neutralized by a basic metal compound other than basic alkali metal compound.

7. The method of claim 1, wherein the formaldehyde additions are limited to one, two, three and four molar weights per molar weight of diamine and the cyanide ion and alkali metal ion content are each correspondingly limited to one, two, three and four ions per molar weight of diamine, thereby selectively forming the mono-, di-, tri- and tetra-carboxylic substituted products of ethylene diamine.

FREDERICK C. BERSWORTH.

REFERENCES CITED

The following references are of record in the file of this patent:

UNITED STATES PATENTS

| Number | Name | Date |
|---|---|---|
| 2,387,735 | Bersworth | Oct. 30, 1945 |
| 2,407,645 | Bersworth | Sept. 17, 1946 |
| 2,411,019 | Bersworth | Nov. 12, 1946 |

FOREIGN PATENTS

| Number | Country | Date |
|---|---|---|
| 482,352 | Great Britain | Mar. 28, 1938 |
| 664,499 | Germany | Aug. 27, 1938 |
| 673,590 | Germany | Mar. 28, 1939 |
| 46,892 | Netherlands | Oct. 16, 1939 |